US008770420B2

(12) United States Patent
Nagaishi et al.

(10) Patent No.: US 8,770,420 B2
(45) Date of Patent: Jul. 8, 2014

(54) WIRING BOX AND METHOD OF MOUNTING THE SAME

(75) Inventors: Noboru Nagaishi, Yokohama (JP); Syuuhei Moriya, Yokohama (JP)

(73) Assignee: Okamura Corporation, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/002,485

(22) PCT Filed: Nov. 21, 2011

(86) PCT No.: PCT/JP2011/076784
§ 371 (c)(1), (2), (4) Date: Aug. 30, 2013

(87) PCT Pub. No.: WO2012/117625
PCT Pub. Date: Sep. 7, 2012

(65) Prior Publication Data

US 2013/0334219 A1 Dec. 19, 2013

(30) Foreign Application Priority Data

Mar. 3, 2011 (JP) ................................ 2011-046620

(51) Int. Cl.
*H02G 3/12* (2006.01)
*A47B 21/06* (2006.01)

(52) U.S. Cl.
CPC ............... *H02G 3/123* (2013.01); *H02G 3/121* (2013.01); *A47B 21/06* (2013.01)
USPC ............. 220/3.5; 220/3.8; 220/826; 220/812; 312/26

(58) Field of Classification Search
CPC ......... H02G 3/123; H02G 3/121; H02G 3/12; H02G 3/085; H02G 3/083; A47B 13/00; A47B 21/06; A47B 97/00
USPC ............ 220/3.8, 3.5, 3.3, 3.2, 4.02, 826, 817, 220/813, 812, 811, 810; 174/559, 520, 500, 174/502, 481; 312/26, 24, 23, 22
See application file for complete search history.

(56) References Cited

U.S. PATENT DOCUMENTS 376,819 A * 1/1888 Horrocks ................ 128/204.13

FOREIGN PATENT DOCUMENTS

JP 2001-161449 A 6/2001
JP 2003-235649 A 8/2003

(Continued)

OTHER PUBLICATIONS

International Search Report issued in PCT/JP2011/076784 with English Translation dated Jan. 17, 2012.

*Primary Examiner* — Robert J Hicks
(74) *Attorney, Agent, or Firm* — McDermott Will & Emery LLP

(57) ABSTRACT

A wiring box includes: a top plate having an opening; a lid body which opens and closes the opening of the top plate; and a rotating arm, one end of the rotating arm being rotatably supported inside the opening of the top plate and another end of the rotating arm rotatably supporting the lid body, wherein the lid body is elevated while being held in a substantially vertical state inside the opening of the top plate by rotation of the rotating arm, and the opening of the top plate is closed by rotation of the lid body at a surface of the opening of the top plate so that a surface of the top plate and a surface of the lid body form a uniform surface.

4 Claims, 12 Drawing Sheets

(56) References Cited

FOREIGN PATENT DOCUMENTS

| | | | |
|---|---|---|---|
| JP | 2006-149733 | A | 6/2006 |
| JP | 2009-100816 | A | 5/2009 |
| JP | 2009-240479 | A | 10/2009 |
| JP | 2010-125213 | A | 6/2010 |

* cited by examiner

WIRING BOX AND METHOD OF MOUNTING THE SAME

This application is the U.S. National Phase under 35 U.S.C. §371 of International Application No. PCT/JP2011/076784, filed on Nov. 21, 2011, which in turn claims the benefit of Japanese Application No. 2011-046620, filed on Mar. 3, 2011, the disclosures of which Applications are incorporated by reference herein.

FIELD

The present invention relates to a wiring box including a lid body which opens and closes an opening of a top plate, and a method of mounting the same.

BACKGROUND

A wiring box including a lid body which opens and closes an opening for wiring, which vertically penetrates through a top plate of a table, is known. The wiring box is mounted to the lower surface of the top plate, and a duct at the lower portion of the wiring box can accommodate power supply devices such as sockets, LAN cables, and the like. In addition, during a work on the top plate using a notebook PC or the like, it is configured to use the socket or the like accommodated in the duct at the lower surface of the top plate via the opening of the top plate.

In addition, the lid body of the wiring box is configured to be selectively opened and closed between a state of closing the opening and a state of opening the opening. Particularly, in the open state of the opening, it is configured to accommodate the lid body inside the wiring box (for example, Patent Literature 1).

As such, the wiring box is configured to be fallen into the opening from above the top plate, and a flange formed in the periphery of the wiring box is caught on the edge of the opening so that positioning of the lid body of the wiring box and the surface of the top plate of the table in the height direction is performed.

In this case, while positioning of the wiring box can be easily performed, the flange in the periphery of the wiring box protrudes from the surface of the top plate and thus there is a problem in that the surface of the top plate is not flat in use (for example, Patent Literature 2). Here, providing a height difference of the height of the flange of the wiring box in the periphery of the opening may be considered. However, molding the periphery of the opening of the top plate becomes complex and thus there is concern that excess cost may be needed (for example, Patent Literature 3)

Therefore, in order to allow the surface of the top plate to be flat in use, a method of inserting the wiring box from below the opening without the use of a hooking member such as a flange may be considered. However, there is a problem of how to enable the upper surface of the lid body of the wiring box to be flush with the surface of the top plate in a case where the top plate with a different thickness is used.

That is, while the thickness of the top plate varies depending on the types of the table, in order to allow a height between the lid body and a mounting metal fitting of the wiring box to be constant, the height of the mounting metal fitting of the wiring box needs to be changed according to the thickness of the top plate. Otherwise, there is also a method which employs mounting metal fittings having an adjusting mechanism corresponding to each top plate thickness. However, a mounting process requires labor, and there is a problem in terms of a selection of components and cost.

CITATION LIST

Patent Literature

Patent Literature 1: Japanese Patent Application Laid-open No. 2009-240479

Patent Literature 2: Japanese Patent Application Laid-open No. 2010-125213

Patent Literature 3: Japanese Patent Application Laid-open No. 2001-161449

SUMMARY

Technical Problem

The present invention relates to a wiring box including a lid body which opens and closes an opening of a top plate, and provides a wiring box which enables a lid body of the wiring box and a top plate surface to form a flat and uniform surface by a simple configuration and enables positioning of the wiring box to be easily performed at the time of mounting the wiring box even when a top plate has a different thickness, and a method of mounting the same.

Solution to Problem

According to one aspect of the present invention, there is provided a wiring box including: a top plate having an opening; a lid body which opens and closes the opening of the top plate; and a rotating arm, one end of the rotating arm being rotatably supported inside the opening of the top plate and another end of the rotating arm rotatably supporting the lid body, wherein the lid body is elevated while being held in a substantially vertical state inside the opening of the top plate by rotation of the rotating arm, and the opening of the top plate is closed by rotation of the lid body at a surface of the opening of the top plate so that a surface of the top plate and a surface of the lid body form a uniform surface.

In this configuration, due to the simple configuration in which the lid body is elevated while being held in the substantially vertical state inside the opening of the top plate by the rotation of the rotating arm, and the opening is closed by the rotation of the lid body at the surface of the opening of the top plate, it is possible to provide a wiring box which enables the lid body of the wiring box and the surface of the top plate to form a flat and uniform surface.

Moreover, the above-described wiring box may further include: a slide pin which is provided in the lid body; and a slide groove which is linked to the slide pin and provided in the wiring box, and the slide groove may be configured to include a slide groove to hold the lid body in the substantially vertical state as the lid body is elevated, and a slide groove to guide the lid body to be rotated at the surface of the opening, which are continuously formed.

In this configuration, due to the simple configuration in which the slide groove, which holds the lid body in the substantially vertical state as the lid body is elevated, and the slide groove, which guides the lid body to be rotated at the surface of the opening, are continuously formed, it is possible to provide a wiring box having an opening and closing mechanism of the lid body which is able to open and close the opening of the top plate. Particularly, the rotational path of the lid body does not draw an arc but draws a substantially right-angled path. Therefore, it is possible to provide a compact wiring box which does not require a space for rotating the lid body inside the top plate. In addition, the rotating mechanism of the lid body is simple and the moving mechanism thereof is small, and thus there are effects of low cost and low opening and closing sound during opening and closing.

Moreover, according to another aspect of the present invention, there is provided a method of mounting the above-described wiring box, the method including the steps of: providing, at a lower surface of the top plate, a plurality of mounting holes in a periphery of the opening of the top plate; providing a plurality of mounting metal fittings in a periphery of the wiring box; and making a height from the surface of the lid body to the mounting metal fittings to be substantially equal to a height from the surface of the top plate to the mounting holes so that the surface of the top plate and the surface of the lid body form a uniform surface when the wiring box is mounted from below the opening of the top plate.

In this configuration, due to the simple configuration in which the height from the surface of the lid body to the mounting metal fittings and the height from the surface of the top plate to the mounting holes are substantially the same, it is possible to simply mount the wiring box from below the top plate without providing a protruding portion such as a flange in the periphery of the upper portion of the wiring box. Particularly, even in a case where the top plate with a different thickness is used, with a simple configuration in which the depth of the mounting hole of the top plate is appropriately set to be the height between the surface of the top plate and the upper surface of the mounting, the wiring box can be mounted so that the surface of the top plate and the surface of the lid body form a uniform surface without changing the height of the mounting metal fittings of the wiring box.

As described above, according to the wiring box of the present invention and the method of mounting the same, it is possible to provide a wiring box which enables a lid body of the wiring box and a surface of a top plate to form a flat and uniform surface and enables positioning of the wiring box to be easily performed at the time of mounting the wiring box even when the top plate has a different thickness, and a method of mounting the same.

BRIEF DESCRIPTION OF DRAWINGS

FIG. 1-2 is a cross-sectional view illustrating the example of the case where a wiring box of the present invention is mounted.

FIG. 2-1 is a partial enlarged view illustrating the example of the case where a wiring box of the present invention is mounted, and is a diagram illustrating lid bodies which are closed.

FIG. 2-2 is a partial enlarged view illustrating the example of the case where a wiring box of the present invention is mounted, and is a diagram illustrating the lid bodies which are open.

FIG. 4-1 is a diagram illustrating the wiring box and is a diagram illustrating the lid bodies which are closed.

FIG. 4-2 is a diagram illustrating the wiring box and is a diagram illustrating the lid bodies which are open.

FIG. 5-1 is an explanatory view (entire perspective view) illustrating an example of mounting of the wiring box.

FIG. 5-2 is an explanatory view (cross-sectional view) illustrating the example of mounting of the wiring box.

FIG. 7-1 is an explanatory view (partial enlarged view) illustrating the example of mounting of the wiring box.

FIG. 7-2 is an explanatory view (cross-sectional view) illustrating the example of mounting of the wiring box.

DESCRIPTION OF EMBODIMENTS (Configuration of Wiring Box)

Hereinafter, the configuration of a wiring box of the present invention will be described.

Figure 1:
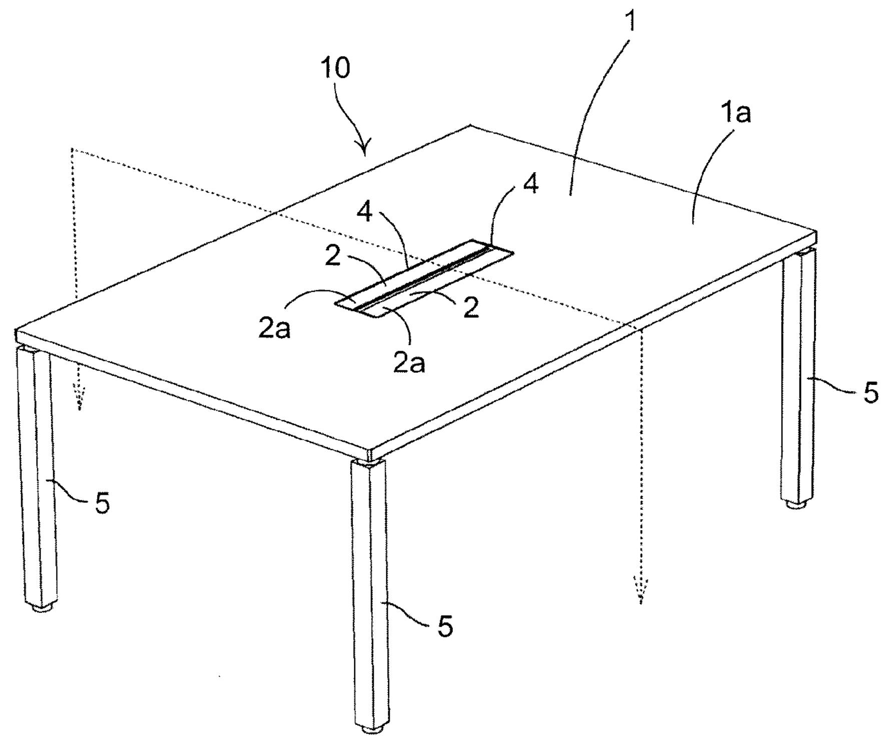
FIG. 1-1 is an entire perspective view illustrating an example of a case where a wiring box of the present invention is mounted.
Figures 1, 2:
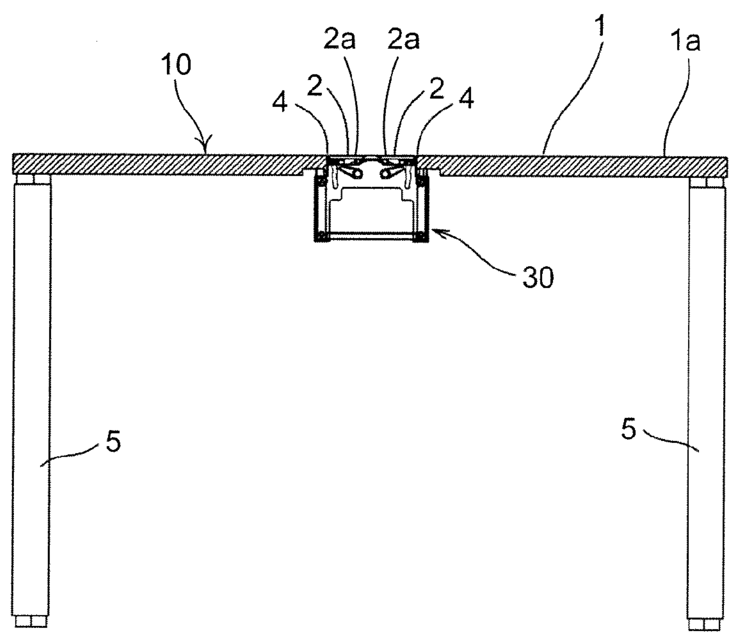
Figures 1, 2:
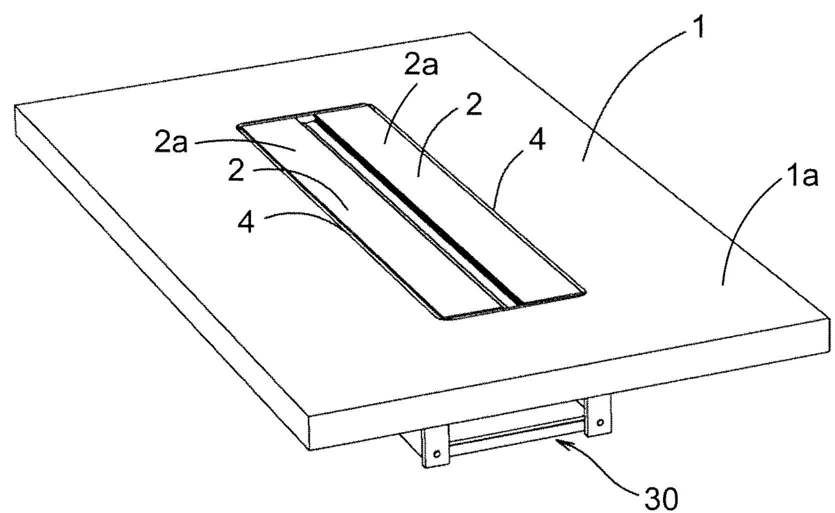
Figure 2:
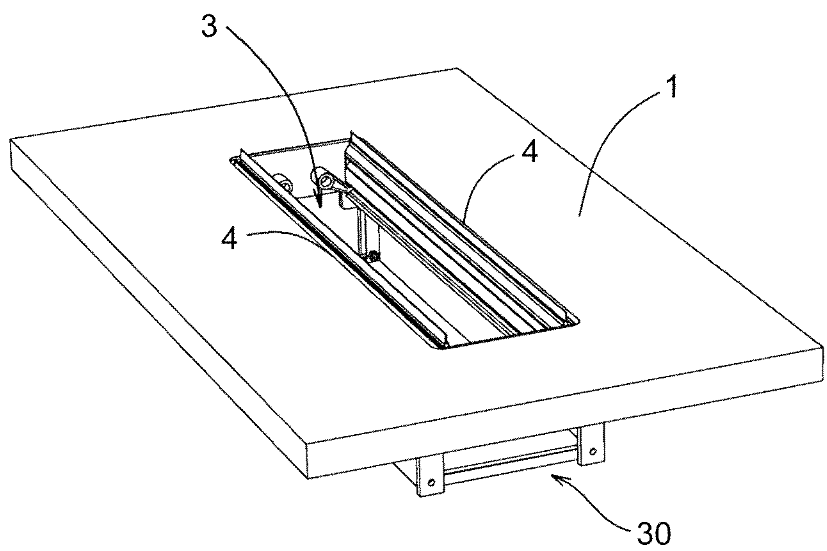

First, an example in which a wiring box 30 of the present invention is appropriately used is, as illustrated in FIGS. 1-1 and 1-2, a table 10 consisting of a top plate 1 which is a work surface, and a plurality of legs 5 which support the top plate 1. The table 10 includes the wiring box 30 having lid bodies 2 which can open and close an opening 3 for wiring (not illustrated), which is formed from the front surface (upper surface) to the rear surface (lower surface) of the top plate 1.

Particularly, the lid bodies 2 of the wiring box 30 are configured to cover almost the entire region of the opening 3 formed in the top plate 1, which will be described later, and are further configured so that lid body upper surfaces 2*a* (lid body surfaces) and a top plate upper surface 1*a* (top plate surface) form a continuous flat surface. Accordingly, members such as a flange for blocking a gap between the lid body 2 and the top plate 1 are not necessary unlike the prior art, it is possible to remove a height difference formed between the lid body 2 and the top plate surface 1*a*, and furthermore, it is possible to reduce the gap between the lid body 2 and the opening 3 to be small. Further, there is no intermediate member such as a flange in the periphery of the opening 3, and the opening 3 is covered only by the lid body 2. Therefore, it is possible for the top plate surface 1*a* to be flat, have good appearance, and thus exhibit high design characteristics.

Next, as illustrated in FIGS. 2-1 and 2-2, the lid bodies 2 in the wiring box 30 of the present invention have a configuration in which the lid bodies 2 are selectively moved between a closed state (FIG. 2-1) in which the opening of the top plate 1 is blocked by the lid bodies 2 and an open state (FIG. 2-2) in which the lid bodies 2 are accommodated inside the opening 3 and the opening 3 for wiring is formed on the top plate.

Particularly, as illustrated in FIG. 2-1, in the wiring box 30 of the present invention, gaps formed between the lid bodies 2 and opening edges 4 are small and the lid body surfaces 2*a* and the top plate surfaces 1*a*, which will be described later, form a flat surface (uniform surface). Therefore, it is possible to not only enhance the design characteristics of the table 10 but also provide the table 10 with high usability.

Figure 3:
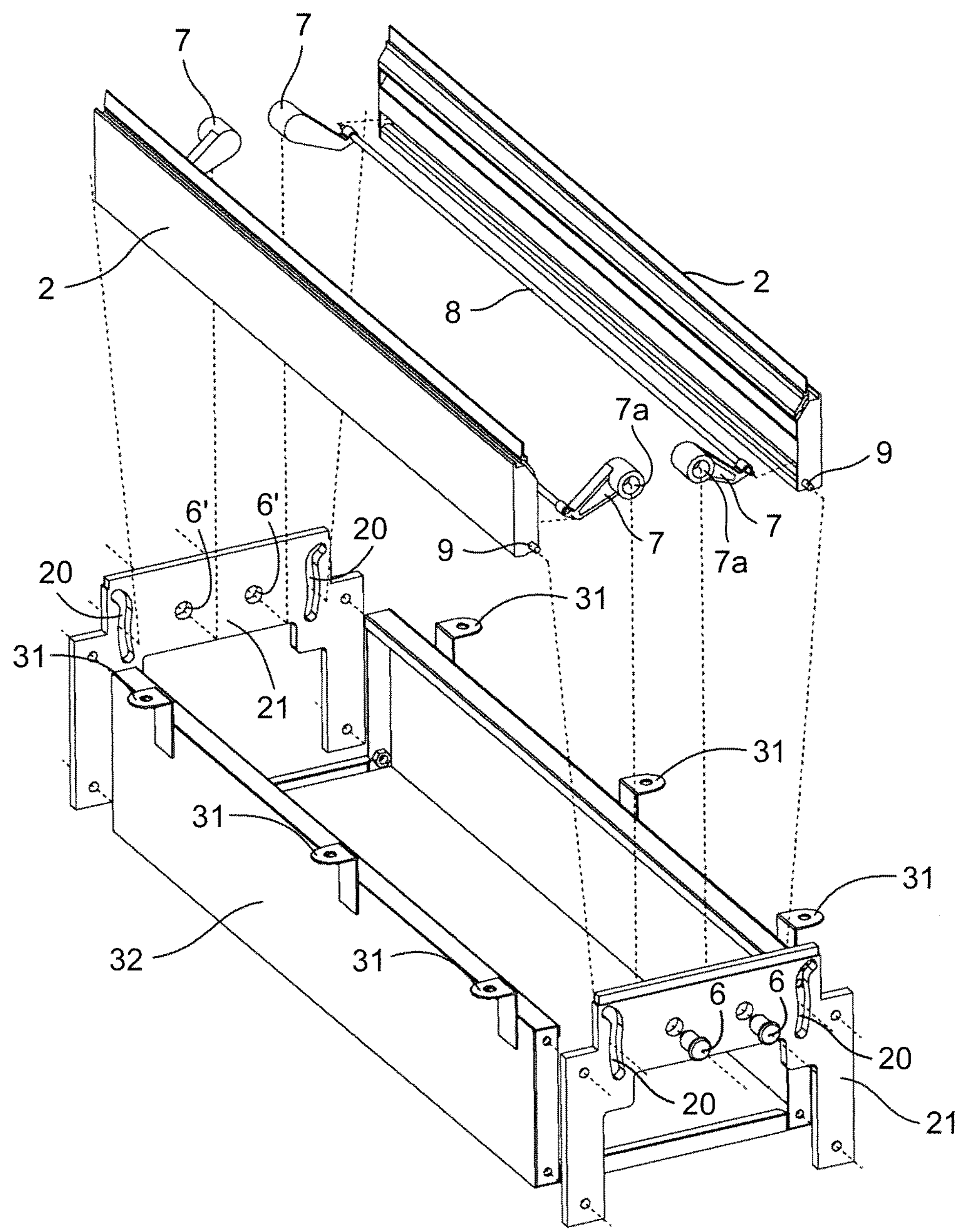
FIG. 3 is an exploded view of the wiring box.

As illustrated in FIG. 3, the wiring box 30 of the present invention includes the left and right lid bodies 2, rotating arms 7 which rotatably support the lid bodies 2, plate-like side covers 21 which rotatably support the rotating arms 7, and a duct 32 which has a U-shaped cross-section and holds the side covers 21. The lid body 2 includes a slide pin 9 which protrudes outward from the rear portion of the side surface thereof. In addition, a bearing (not illustrated) to rotatably support the rotating arms 7 is included inside of the lid body 2.

Further, the duct 32 is worked by bending a steel plate or the like, and reverse L-shaped mounting metal fittings 31 are welded to the upper end portions of the left and right surfaces thereof in a state of protruding upward. The mounting metal fittings 31 are formed to have flat upper end surfaces and have threaded holes formed at substantially the center portions thereof.

In addition, the side covers 21 made of resin are fixed to the front and rear portions of the duct 32 by screws or the like (not illustrated), and the side covers 21 are provided with longitudinal slide grooves 20 with which the slide pins 9 of the lid bodies 2 are engaged and axial holes 6' for rotatably supporting the rotating arms 7.

In addition, the axial holes 6' support one end 7*a* of the rotating arms 7 to be rotated by shafts 6 and the slide pins 9 of the lid bodies 2 which protrude in the horizontal direction are engaged with the slide grooves 20. Accordingly, the lid bodies 2 are moved up and down along with the rotation of the rotating arms 7 and the slide pins 9 of the lid bodies 2 are able to slide along the slide grooves 20.

Figures 1, 4:
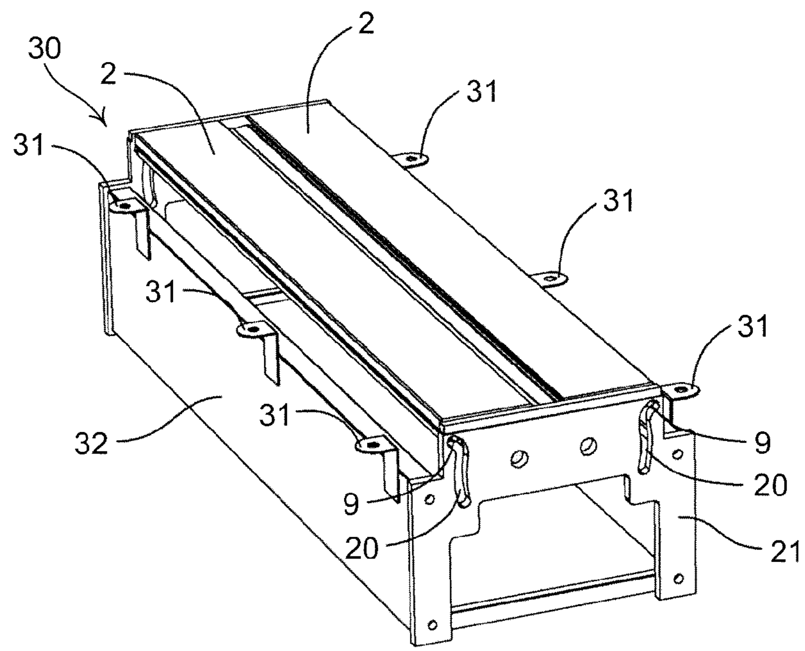
Figures 2, 4:
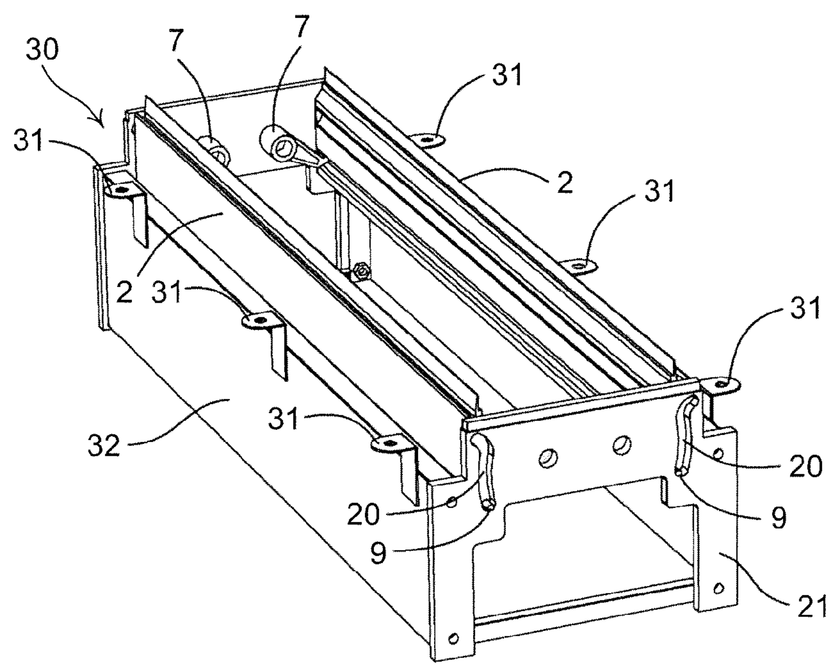

That is, at the time of closing the opening by the lid bodies 2, as illustrated in FIG. 4-1, the left and right lid bodies 2 are held in a state of being parallel and come into close contact with each other at the upper portion of the wiring box 30, and at the time of opening the lid bodies 2, as illustrated in FIG. 4-2, the left and right lid bodies 2 are accommodated in the wiring box 30 while being held in substantially vertical states.

(Method of Mounting Wiring Box)

Hereinafter, a method of mounting the wiring box 30 of the present invention from below the top plate 1 will be described.

Figures 1, 5:
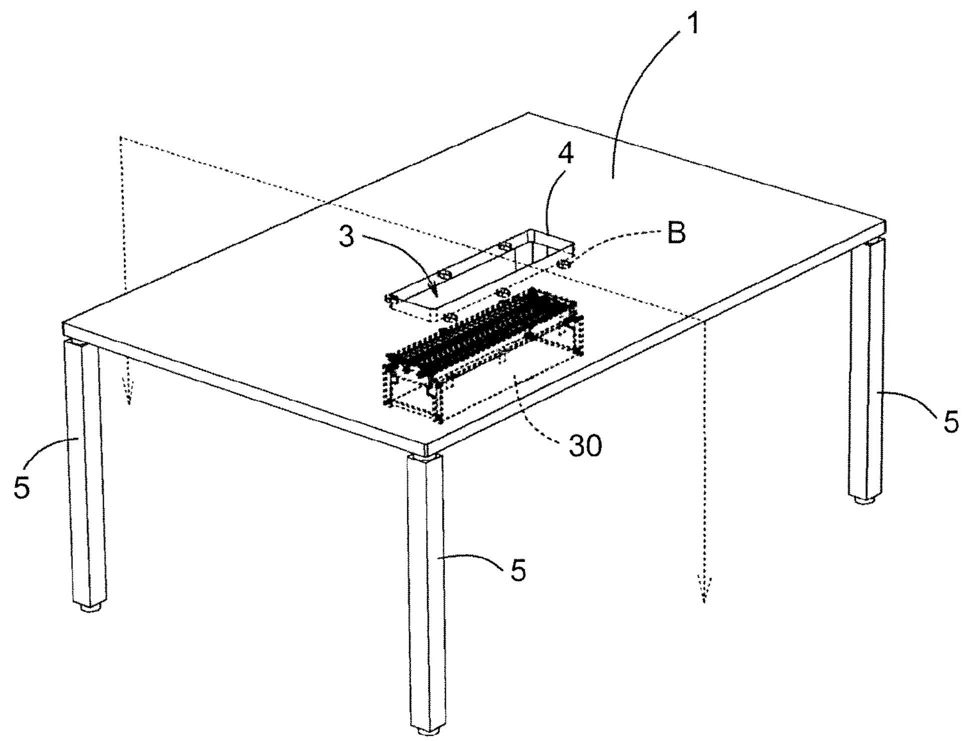
Figures 2, 5:
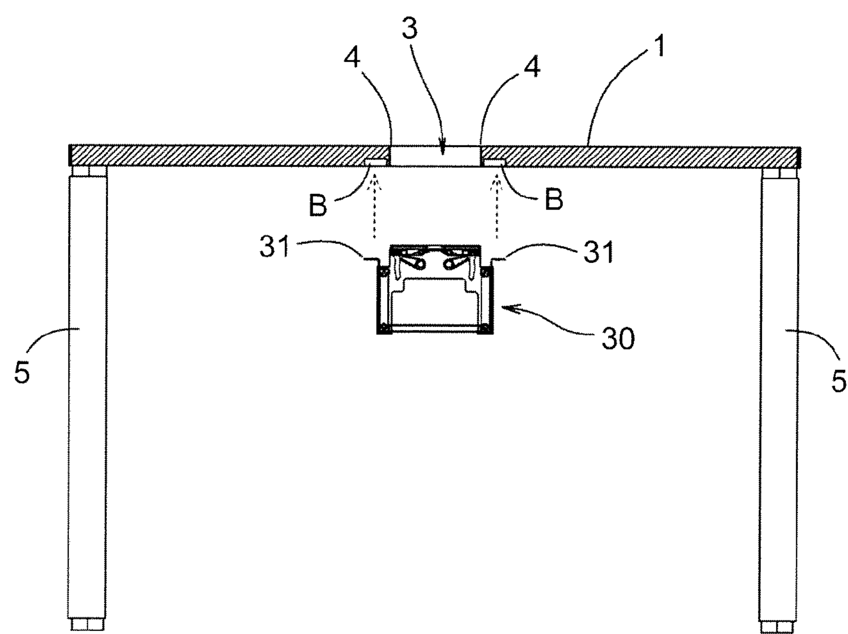

As illustrated in FIGS. 5-1 and 5-2, the top plate 1 has the rectangular opening 3 formed at substantially the center of the top plate 1 from the front surface of the top plate 1 to the rear surface thereof. In addition, a plurality of convex mounting holes B are formed at the rear surface of the top plate 1 and in the periphery of the opening 3, and the dimensions of the plurality of mounting holes B in the height direction between the upper surfaces of the mounting holes B and the top plate surface 1*a* are accurately determined.

In addition, by only inserting the plurality of mounting metal fittings 31 formed in the periphery of the wiring box 30 into the mounting holes B to be fixed, it is possible to position and mount the wiring box 30 to the lower surface of the top plate 1 accurately and simply.

Figure 6:
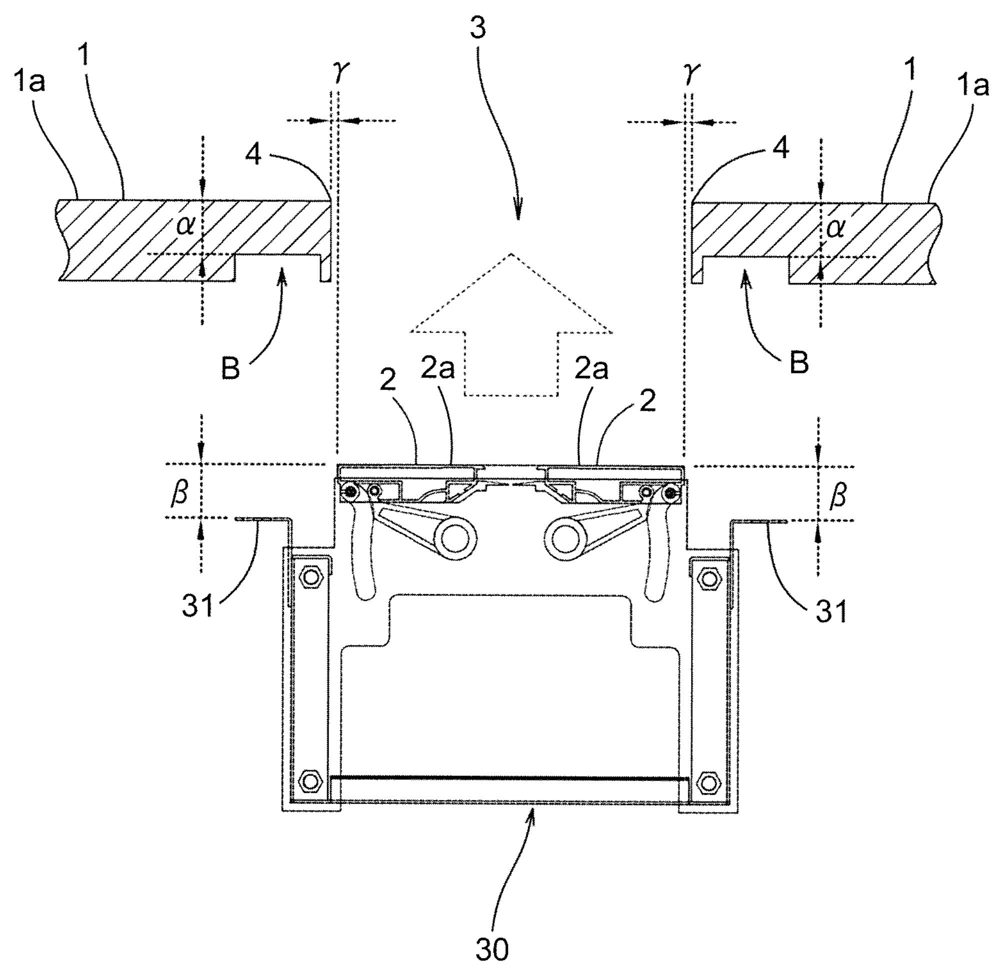
FIG. 6 is an explanatory view illustrating the example of mounting of the wiring box.

That is, as illustrated in FIG. 6, a distance a between the top plate surface 1*a* and the upper surface of the mounting holes B is the same ($\alpha=\beta$) as a distance $\beta$ between the lid body surface 2*a* of the wiring box 30 and the upper surface of the mounting metal fittings 31. Accordingly, when the wiring box 30 is mounted, a flat and uniform surface without a height difference between the lid body surface 2*a* and the top plate surface 1*a* is formed. In addition, the width of the opening 3 and the width of the lid bodies 2 are substantially the same, and thus gaps 7 between the opening edges 4 of the top plate 1 and the lid bodies 2 are less likely to be generated.

Figures 1, 7:
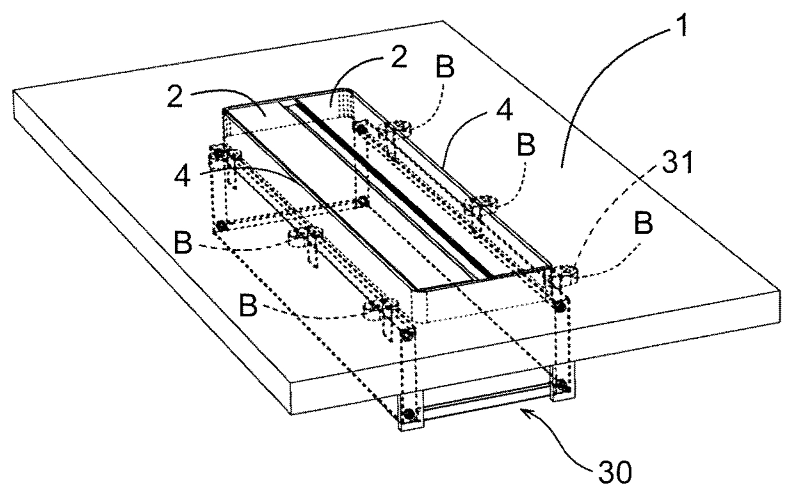
Figures 2, 7:
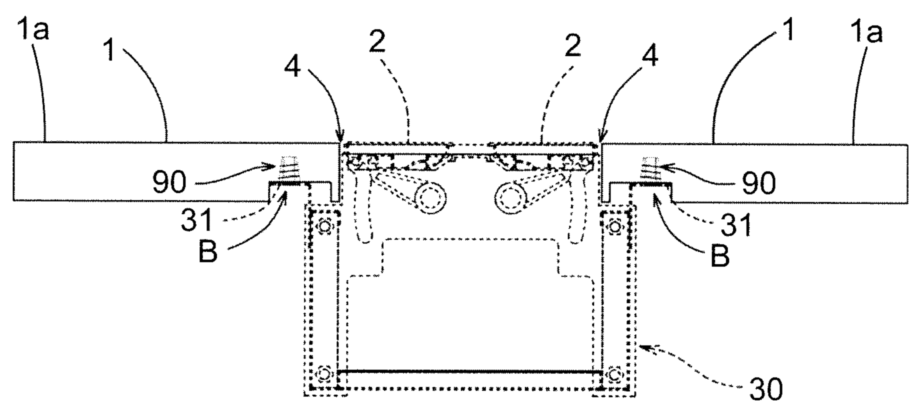

Therefore, in the wiring box 30 of the present invention, as illustrated in FIGS. 7-1 and 7-2, a flat and uniform surface without a height difference between the lid bodies 2 of the wiring box 30 and the top plate surface 1*a* of the table is formed, and positioning and mounting of the wiring box 30 can be simply and accurately performed in the state where gaps between the lid bodies 2 and the opening edges 4 are less likely to be generated. For example, as illustrated, screw receivers 90 are provided in the mounting holes B of the top plate 1, and thus the mounting metal fittings 31 of the wiring box 30 can be simply screwed to the screw receivers 90 in a state of being inserted through the mounting holes B. In addition, the wiring box 30 can be fixed while being accurately positioned.

Further, a wiring box according to the prior art has a structure in which a unit having a flange part and a mechanism of a lid body integrated in one body is fallen from the above of the top plate and has a separate body structure in which a duct part that receives wires is mounted from the lower side of a top plate. Contrary to this, the wiring box 30 of the present invention has a structure with no flange part and is in a state where the opening parts of the top plate 1 are completed, and a simple configuration in which the wiring box 30 is inserted into the opening 3 from the lower side of the top plate 1 and the plurality of mounting metal fittings 31 of the wiring box 30 may only be inserted and mounted into the mounting holes B at the lower surface of the top plate is achieved. In addition, the duct 32 which receives wires has a structure integrated with the lid bodies 2 in one body, and thus there is an effect of significantly reducing the number of components and the number of mounting operations.

Moreover, according to the prior art, when a method of mounting a wiring box from the lower side of a top plate is applied, there is a problem of how to enable the upper surface of the lid bodies 2 of the wiring box to be flush with the top plate surface 1*a* in a case of using the top plate 1 with a different thickness. For example, there is a method which employs mounting metal fittings having an adjusting mechanism corresponding to each top plate thickness. However, there is a problem in terms of a selection of components and cost.

Here, in the method of mounting the wiring box 30 of the present invention, the smallest thickness is postulated as a top plate thickness in advance, and in a case where the top plate thickness is a thickness of 20 mm, the mounting metal fittings 31 are configured to enable the lid bodies 2 and the top plate 1 to form a uniform surface at a thickness of 20 mm. In addition, regarding the top plate 1 having a thickness of 20 mm or greater, a simple configuration in which a thickness of 20 mm from the top plate surface 1*a* is left and the mounting holes B are formed at the lower surface of the top plate 1 is employed. Accordingly, it is possible to simply mount the wiring box 30 in the state where the lid body surface 2*a* and the top plate surface 1*a* are flush with each other.

(Opening and Closing Mechanism of Wiring Box)

Hereinafter, an opening and closing mechanism of the lid bodies 2 in the wiring box 30 of the present invention will be described.

The movement of the lid bodies 2 in the wiring box 30 of the present invention is the opening and closing mechanism of opening and closing the opening 3 of the top plate 1 by elevating the lid bodies 2 inside the opening of the top plate 1 and rotating the lid bodies 2 at the surface of the opening of the top plate 1.

Figure 8:
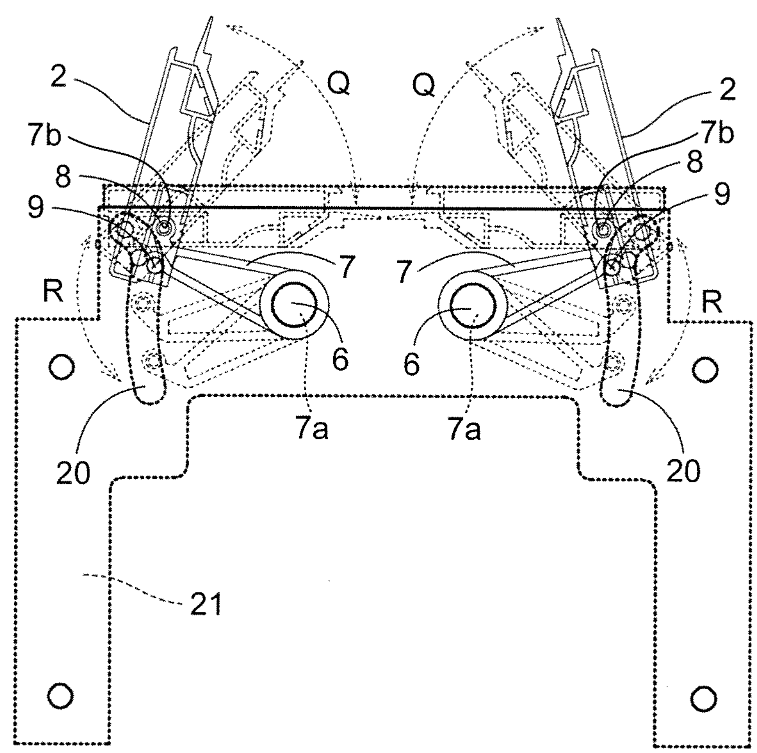
FIG. 8 is an explanatory view illustrating movements of the lid bodies and rotating arms in the wiring box of the present invention.

Specifically, as illustrated in FIG. 8, the rear portions of the lid bodies 2 are rotatably supported by the other ends 7*b* of the rotating arms 7 of which one ends 7*a* are rotatably supported by the side cover 21 of the wiring box 30, and further, the slide pins 9 protruding from the rear portions of the lid bodies 2 are movably linked to the slide grooves 20 formed in the side cover 21. Accordingly, the lid bodies 2 are elevated by the rotation of the rotating arms 7 while being held in the substantially vertical state, and the lid bodies 2 are rotated in a direction to close the opening in the vicinity of the opening of the top plate 1 so that the lid bodies 2 close the opening 3 of the top plate 1.

Particularly, the slide pins 9 provided at the rear portions of the lid bodies 2 move along the slide grooves 20 while meshing with the slide grooves 20 formed in the side cover 21 of the wiring box 30, and thus the movement of the rear end parts of the lid bodies 2 is regulated by the positions of the rotating arms 7.

That is, the slide groove 20 is the slide groove 20 in which a vertical slide groove, which holds the lid body 2 in the substantially vertical state as the lid body 2 is elevated, and an outwardly curved slide groove, which guides the lid body 2 to be rotated in the vicinity of the surface of the opening of the top plate 1, are continuously arranged.

Accordingly, as the rotating arms 7 are lifted, the path of the rear portion of the lid body 2 draws a path (the arrow R in the figure) which is vertically elevated inside the opening and a path (the arrow Q in the figure) in which the lid body 2 is rotated in a direction to close the opening in the vicinity of the surface of the opening.

Particularly, in the opening and closing mechanism of the lid bodies 2 of the present invention, the path drawn by the lid body 2 is not arc but is a substantially right-angled path made by a combination of the vertical direction and the rotational direction, and thus the path of the lid body 2 is always positioned on the inside of the opening 3. Therefore, the rear portion of the lid body 2 does not protrude outward from the opening edge 4 of the top plate 1. Accordingly, there is no need to additionally provide a space along the arc path of the lid body according to the prior art, and there is no need to provide a member such as a flange between the lid body 2 and the opening 3.

Next, the movement of the lid body 2 in the wiring box 30 of the present invention will be described.

Figure 9:
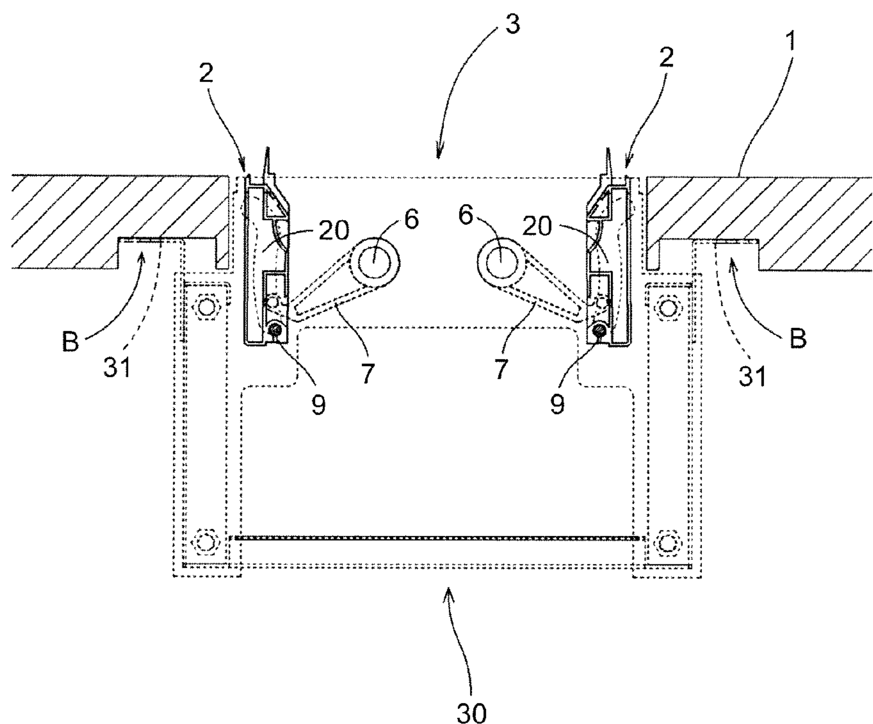
FIG. 9 is an explanatory view illustrating movements of the lid bodies in the wiring box of the present invention.

First, in the open state of the wiring box 30, as illustrated in FIG. 9, the lid bodies 2 are in a state of being accumulated inside the opening of the top plate 1, and particularly, in a state where the lid bodies 2 are accommodated while being vertically held and only the tip end portions of the lid bodies 2 are slightly exposed from the surface of the opening of the top plate 1 on the upper side.

Figure 10:
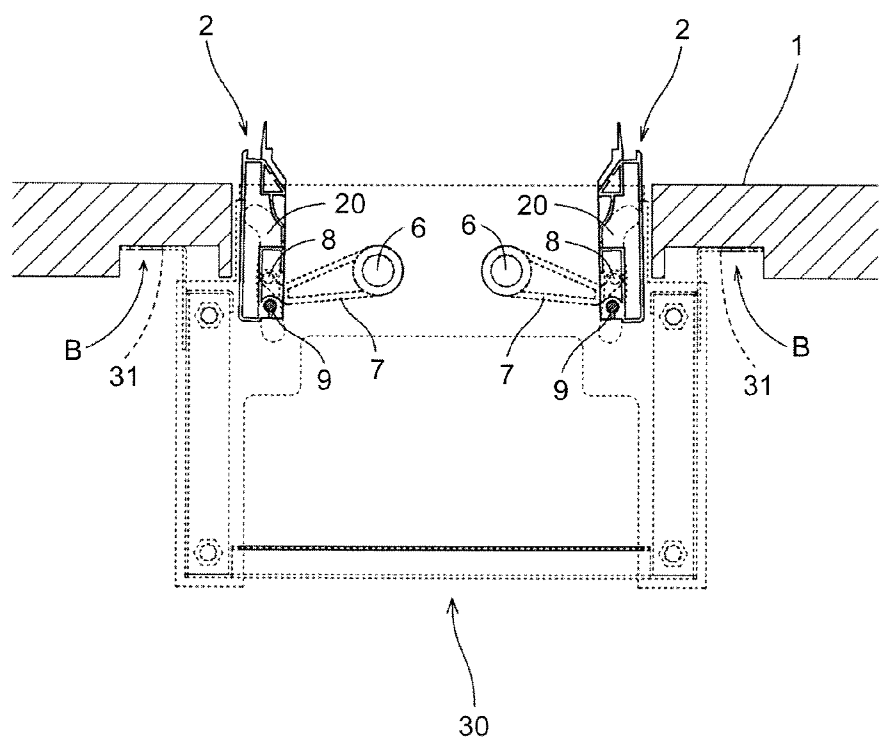
FIG. 10 is an explanatory view illustrating movements of the lid bodies in the wiring box of the present invention.

In addition, from the state where the lid bodies 2 are accumulated, the tip end portions of the lid bodies 2 are grabbed and pulled upward so that the lid bodies 2 start being elevated by the rotation of the rotating arms 7 as illustrated in FIG. 10. At this time, the rotating arms 7 are rotated in the upward direction about the shafts 6 as the fulcrums and the lid bodies 2 are lifted in the vertical state so that the slide pins 9 of the rear portions of the lid bodies 2 slide along the slide grooves 20. At this time, the slide pins 9 of the lid bodies 2 that slide along the slide grooves 20 and shafts 8 of the rotating arms 7 which rotatably support the lid bodies 2 are positioned to be on a vertical extension line, and even when the rotating arms 7 are rotated, the lid bodies 2 are lifted while being vertically held.

Figure 11:
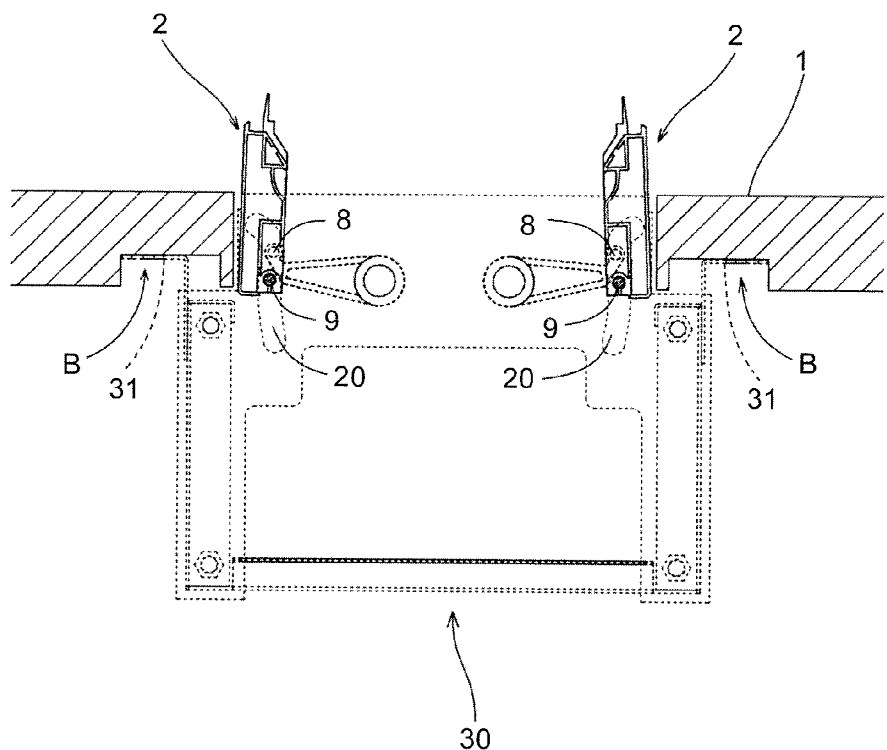
FIG. 11 is an explanatory view illustrating movements of the lid bodies in the wiring box of the present invention.

In addition, as the rotating arms 7 are further rotated, the lid bodies 2 are lifted upward as illustrated in FIG. 11, and the slide pins 9 of the lid bodies 2 are lifted along the slide grooves 20. At this time, the slide pins 9 of the lid bodies 2 and the shafts 8 of the rotating arms 7 are held in the substantially vertical state, and the lid bodies 2 are lifted inside the opening while still maintaining the vertically upright state.

Figure 12:
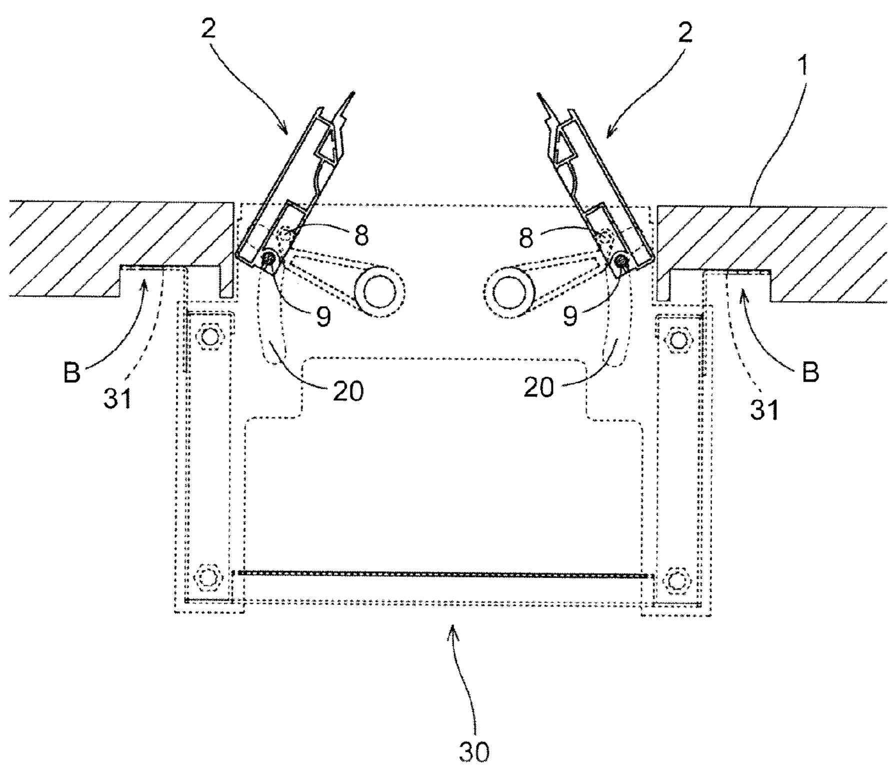
FIG. 12 is an explanatory view illustrating movements of the lid bodies in the wiring box of the present invention.

In addition, as the rotating arms 7 are further rotated, the lid bodies 2 are lifted upward as illustrated in FIG. 12, and the slide pins 9 of the lid bodies 2 are lifted along the slide grooves 20. At this time, the shape of the slide groove 20 with which the slide pin 9 of the lid body 2 meshes is changed from the vertical shape to the outwardly curved shape, and the positional relation between the shaft 8 of the rotating arm 7 and the slide pin 9 of the lid body 2 starts changing.

Figure 13:
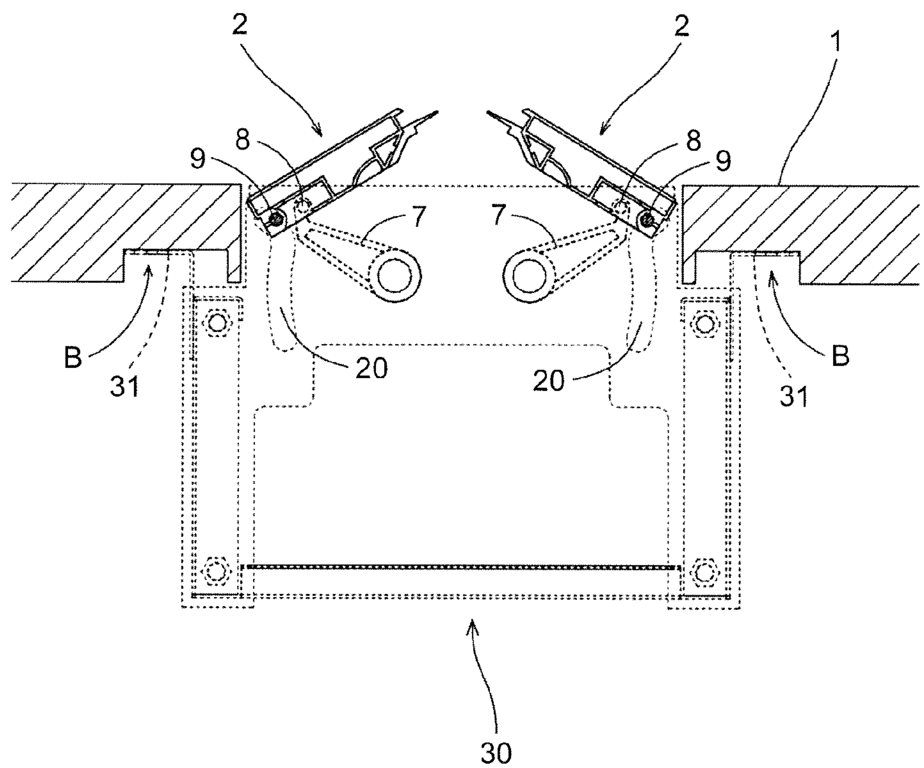
FIG. 13 is an explanatory view illustrating movements of the lid bodies in the wiring box of the present invention.

That is, as illustrated in FIG. 13, at the timing when the major part of the lid body 2 protrudes upward from the surface of the opening, the rotation of the rotating arm 7 in the upward direction is maximized, and the shape of the slide groove along which the slide pin 9 of the lid body 2 slides is changed to the shape of the slide groove 20 which draws a gentle arc in the outward direction. At this time, the slide pin 9 of the lid body 2 starts moving outward along the shape of the slide groove 20, and the positional relation between the slide pin 9 and the shaft 8 of the rotating arm 7 starts gradually changing to the horizontal direction from the vertical direction. Accordingly, the lid bodies 2 are rotated about the shafts 8 of the rotating arms 7 as the fulcrums.

Figure 14:
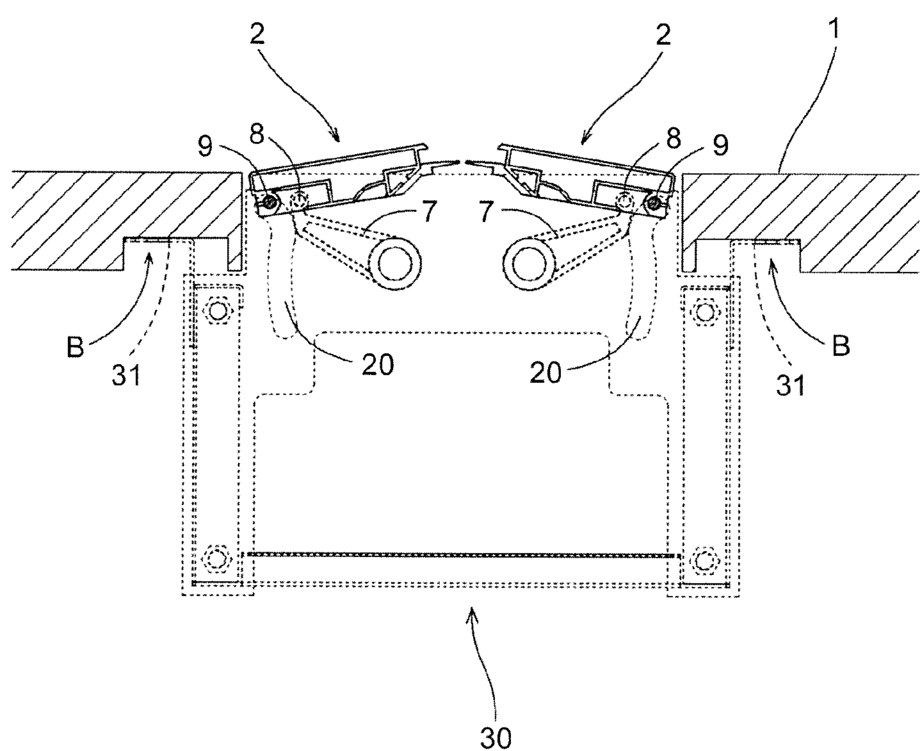
FIG. 14 is an explanatory view illustrating movements of the lid bodies in the wiring box of the present invention.

In addition, as illustrated in FIG. 14, the slide pin 9 of the lid body 2 is further moved outward along the arc slide groove 20 and the rotating arm 7 is slightly rotated to return so as to lift the rear portion of the lid body 2 so that the lid bodies 2 are rotated in the direction to close the opening.

Figure 15:
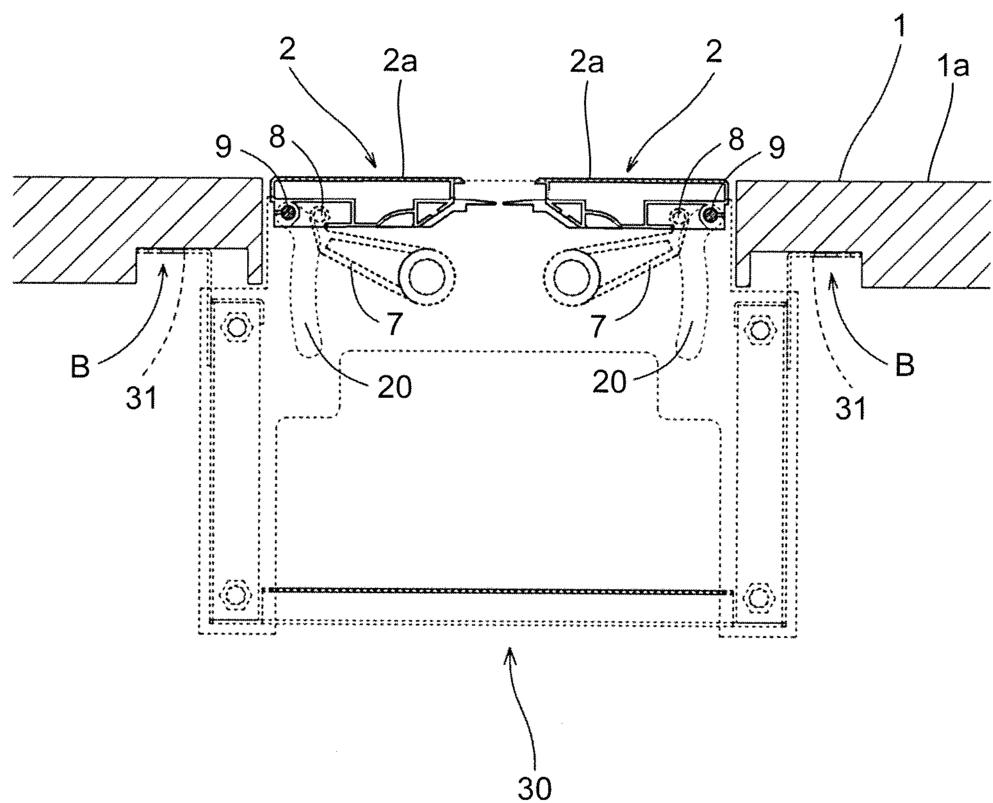
FIG. 15 is an explanatory view illustrating movements of the lid bodies in the wiring box of the present invention.

In addition, at the points where the left and right lid bodies 2 are horizontal, further rotation of the lid bodies 2 is impeded by members such as stoppers (not illustrated), and thus the closed state in which the top plate surface 1*a* and the lid body surface 2*a* form a uniform surface is formed as illustrated in FIG. 15.

As described above, in the wiring box 30 of the present invention, the lid bodies 2 are rotatably supported by the other ends 7*b* of the rotating arms 7 of which one ends 7*a* are rotatably supported inside the opening, the lid bodies 2 are elevated while being held in the substantially vertical state inside the opening of the top plate 1 by the rotation of the rotating arms 7, and the opening 3 is closed by the rotation of the lid bodies 2 at the surface of the opening of the top plate 1 so that the top plate surface 1*a* and the lid body surface 2*a* form a uniform surface. Therefore, it is possible to provide the wiring box 30 which enables the lid bodies 2 of the wiring box 30 and the top plate 1 to form a flat and uniform surface by the simple configuration at the time of opening the opening of the top plate.

In addition, in the wiring box 30, the slide pins 9 are provided in the lid bodies 2 and the slide grooves 20 which are linked to the slide pins 9 are provided in the wiring box 30. In addition, the slide groove 20 is a groove in which the slide groove 20, which holds the lid body 2 in the substantially vertical state as the lid body 2 is elevated, and the slide groove 20, which guides the lid body 2 to be rotated at the opening surface of the top plate 1, are continuously formed. Therefore, the path drawn by the lid body 2 is not arc but is a substantially right-angled path made by a combination of the vertical direction and the rotational direction. Accordingly, the path of the lid body 2 is always positioned on the inside of the opening 3, and thus the rear portion of the lid body 2 does not protrude outward from the opening edge 4 of the top plate 1. Therefore, there is no need to additionally provide a space along the arc path of the lid body according to the related art, and there is no need to provide a member such as a flange between the lid body 2 and the opening 3.

Furthermore, in the method of mounting the wiring box 30 of the present invention, the plurality of mounting holes B are provided in the periphery of the opening 3 at the lower surface of the top plate 1, the plurality of mounting metal fittings 31 are provided in the periphery of the wiring box 30, and the height from the lid body upper surface 2*a* to the mounting metal fitting 31 and the height from the top plate surface 1*a* to the mounting hole B are substantially the same. Therefore, when the wiring box 30 is mounted from below the opening 3, the top plate surface 1*a* and the lid body surface 2*a* form a uniform surface.

Therefore, it is possible to mount the wiring box 30 from below the top plate 1 without providing a protruding member such as a flange at the upper portion of the wiring box 30. In addition, even in a case where the top plate 1 with a different thickness is used, with a simple configuration in which the depth of the mounting hole B of the top plate 1 is appropriately set to be the height between the top plate surface 1*a* and the upper surface of the mounting, the wiring box 30 can be mounted so that the top plate surface 1*a* and the lid body surface 2*a* form a uniform surface without changing the height of the mounting metal fittings 31 of the wiring box 30.

In the above-described example, an example in which the lid bodies 2 of the wiring box 30 are respectively formed on the left and the right is described. However, the present invention is not limited thereto, and for example, a single lid body may be employed to exhibit the same effect. In addition, the example in which the left and right lid bodies 2 are simultaneously moved is described. However, the left and right lid bodies 2 may also be separately moved. In either case, it is natural that the present invention is not limited to the above-described embodiments and can be embodied more effectively by appropriately adding other elements.

REFERENCE SIGNS LIST

1 TOP PLATE
2 LID BODY
3 OPENING
4 OPENING EDGE
5 LEG
6 SHAFT
7 ROTATING ARM
8 SHAFT
9 SLIDE PIN
10 TABLE
20 SLIDE GROOVE
21 SIDE COVER
30 WIRING BOX
31 MOUNTING METAL FITTING
32 DUCT
B MOUNTING HOLE

The invention claimed is:

1. A wiring box comprising:

a top plate having an opening;

a lid body which opens and closes the opening of the top plate; and a rotating arm, one end of the rotating arm being rotatably supported inside the opening of the top plate and another end of the rotating arm rotatably supporting the lid body, wherein the lid body is elevated while being held in a substantially vertical state inside the opening of the top plate by rotation of the rotating arm, and the opening of the top plate is closed by rotation of the lid body at a surface of the opening of the top plate so that a surface of the top plate and a surface of the lid body form a uniform surface.

2. The wiring box according to claim 1, further comprising:

a slide pin which is provided in the lid body; and a slide groove which is linked to the slide pin and provided in the wiring box, and wherein the slide groove is configured to include a slide groove to hold the lid body in the substantially vertical state as the lid body is elevated, and a slide groove to guide the lid body to be rotated at the surface of the opening, which are continuously formed.

3. A method of mounting a wiring box comprising: a top plate having an opening; a lid body which opens and closes the opening of the top plate; and a rotating arm, one end of the rotating arm being rotatably supported inside the opening of the top plate and another end of the rotating arm rotatably supporting the lid body, wherein the lid body is elevated while being held in a substantially vertical state inside the opening of the top plate by rotation of the rotating arm, and the opening of the top plate is closed by rotation of the lid body at a surface of the opening of the top plate so that a surface of the top plate and a surface of the lid body form a uniform surface, the method comprising the steps of:

providing, at a lower surface of the top plate, a plurality of mounting holes in a periphery of the opening of the top plate;

providing a plurality of mounting metal fittings in a periphery of the wiring box; and making a height from the surface of the lid body to the mounting metal fittings to be substantially equal to a height from the surface of the top plate to the mounting holes so that the surface of the top plate and the surface of the lid body form a uniform surface when the wiring box is mounted from below the opening of the top plate.

4. The method of mounting the wiring box according to claim 3, wherein the wiring box further comprises:

a slide pin which is provided in the lid body; and a slide groove which is linked to the slide pin and provided in the wiring box, and the slide groove is configured to include a slide groove to hold the lid body in the substantially vertical state as the lid body is elevated, and a slide groove to guide the lid body to be rotated at the surface of the opening, which are continuously formed.

* * * * *